Oct. 29, 1929.  F. E. COMSTOCK  1,733,777
LINE AND WEIGHT ATTACHMENT FOR FISH BAITS
Filed March 7, 1927
Fig. 1.
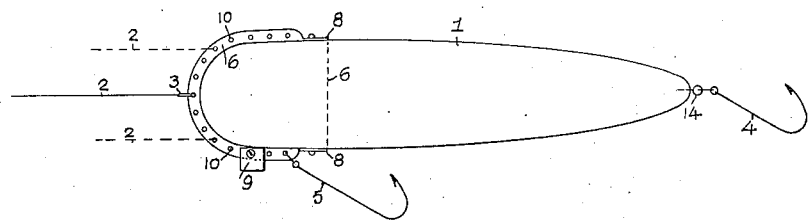
Fig. 2.
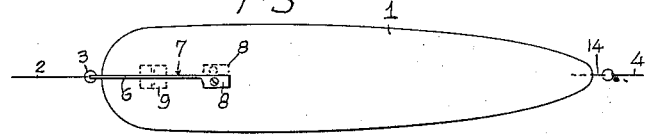
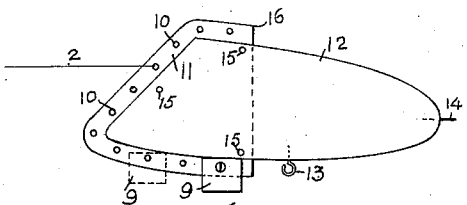
Fig. 3.
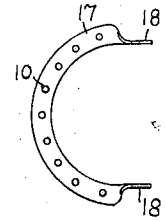
Fig. 4.
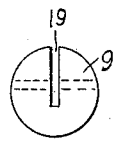
Fig. 5.
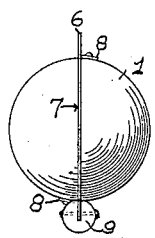
Fig. 6.
Frederick E. Comstock  Inventor
H. S. Amstutz
By
Attorney Patented Oct. 29, 1929

1,733,777

UNITED STATES PATENT OFFICE

FREDERICK E. COMSTOCK, OF VALPARAISO, INDIANA

LINE AND WEIGHT ATTACHMENT FOR FISH BAITS

Application filed March 7, 1927. Serial No. 173,252.

My invention relates to improvements in line and weight attachment for fish baits, and it more especially consists of the features pointed out in the claims.

The purpose of my invention is to provide means for attaching a fish line at the head end of a bait in an adjustable manner; that also provides means for adjustably securing a weight near the head end of the bait; that may make the attachment an inherent part of the bait; and that may also make the attachment adapted to existing forms of bait.

With these and other ends in view, I illustrate in the accompanying drawing such instances of adaptation as will disclose the broad underlying features of my invention without limiting myself to the specific details shown thereon and described herein.

Figure 1 is a side elevation showing one form of my attachment.

Figure 2 is a plan view of Figure 1.

Figure 3 shows a modified type of bait.

Figure 4 is a side elevation of an attachable device.

Figure 5 is an end elevation of an attachable weight.

Figure 6 is a front elevation of Figure 1.

In carrying out my invention in actual practice I may use such alternatives of construction as the exigencies of practical conditions may demand without departing from the broad spirit of the invention.

Any desired form of body 1, 12, or any other type may be used. The body 1 may be supplied at its rear end with a screw eye 14 to which a hook 4 may be attached. In the case of the sloping head body 12, shown in Fig. 3, an under screw eye 13 may be attached on which any desired type of hook may be secured.

A vertical slot 7, shown in Figs. 2 and 6, is cut into the front end of the body 1 to whatever depth it is desired that the attachment 6 may extend; or the attachment 16 may extend into a different type of body 12, shown in Fig. 3. The line and weight attachment 6, 16 and 17 is provided with a series of openings 10, the forward and upper openings serving more especially for the fish line 2, and the lower openings serving as a means of attachment for the weight 9, shown in Figs. 1 and 3; or in the case of Fig. 1 an under hook 5 may be secured in one of the openings 10 by means of the usual type of split ring to give greater freedom to the movement of the hook.

The flat plate 6 may be shaped to conform to the front end of the bait 1. At its rear upper and lower edges it may have ears 8 bent at right angles, both in one direction, or in opposite directions, so as to serve as fastening means for holding the plate 6 firmly attached to the bait 1. The line 2 may be attached to any one of the holes 10 by split ring 3, shown in Figs. 1 and 2. A change in line position is shown by dotted lines in Fig. 1. The alternative form of plate 16 is shown in Fig. 3. This is also positioned in a slot formed in the bait 12 where it may be held by cross pins 15, or in any other desired manner.

When it is desired to provide existing forms of bait with my attachment without cutting a slot into the same, the type of attachment shown in Fig. 4 may be used; in which case the flat portion 17 formed approximately in the shape of a half circle may have its ends terminate in right angled ears 18, by means of which the attachment may be secured to the top and under side of a bait in a rigid or pivotal manner, as desired. The weight 9 has a slot 19 into which the attachment 6, 16 or 17 depends and to which the weight may be secured in an attachable and detachable manner, by means of a screw, or otherwise. In case the attachment 17 is to be rigidly secured to a bait, it may be held against pivoting on the ears 18, at the front end of the bait, in any desired manner. Obviously this may be accomplished by forming a shallow recess in the front end of the bait.

The bait can be made heavier or lighter by using different sizes of the weight 9, and the degree of floatation of the bait is dependent on the size of the weight and where it is applied. A shift in its position changes the balance of the bait. The wave-like swimming movement of the bait is made to pass through longer sweeps by attaching the line to the openings 10 above and to the rear of the front end center of the bait. The length of the swimming movement is also cooperatively modified by the location of the weight; and as stated, the heavier the weight the deeper the bait will float, and vice versa. From this it will be seen that, contrary to the usual form of fixed point of attachment for the fish line, my bait is free from such limitations. The fisherman may adapt the same bait to whatever varying conditions of stream, or kind of fish he may desire to secure, which in every case will leave the expert fisherman master of whatever conditions he may encounter.

What I claim is:

1. In fish baits, a floatable body, a projecting fin extending forward beneath and above the front end of the body, means for securing the same to the body, means for variably positioning a line attachment to the fin, an adjustable weight on the fin, means for variably positioning an attachable and detachable weight on the fin, and means for securing a hook on the fin to the rear of the weight.

2. A combined line and weight attachment for a fish bait comprising a fin which projects forward above and below the front end of the bait, means for variably positioning a line on the fin, a weight on the fin depending below the body, means for variably positioning the weight on the fin, and means for securing the fin to the bait.

In testimony whereof I affix my signature.

FREDERICK E. COMSTOCK.